United States Patent Office 2,754,290
Patented July 10, 1956

2,754,290

THERMAL POLYMERIZATION OF ACRYLONITRILE, METHACRYLONITRILE, AND LOWER ALKYL METHACRYLATES USING BENZOTHIAZOLYL DISULFIDE COMPOUNDS AS INITIATOR

Roland J. Kern, Dayton, Ohio, assignor to Monsanto Chemical Company, St. Louis, Mo., a corporation of Delaware No Drawing. Application May 8, 1953,
Serial No. 353,911

14 Claims. (Cl. 260—88.7)

This invention relates to the thermal polymerization of acrylonitrile, methacrylonitrile and the lower alkyl methacrylates. In specific aspects the invention pertains to new thermal initiators for the polymerization of acrylonitrile, methacrylonitrile and the lower alkyl methacrylates.

An object of this invention is to effect the polymerization of a monomer selected from the group consisting of acrylonitrile, methacrylonitrile, and the lower alkyl methacrylates. Another object of the invention is to increase the rate of polymerization of these monomers when heated. A further object is to provide a new class of thermal polymerization initiators. Yet another object is to employ benzothiazolyl disulfide compounds as thermal initiators (catalysts) for the polymerization of acrylonitrile, methacrylonitrile and the lower alkyl methacrylates. A still further object is to initiate the thermal polymerization of these monomers with the aid of a benzothiazolyl disulfide. Further objects and advantages of the invention will be apparent to one skilled in the art from the accompanying disclosure and discussion.

In accordance with preferred embodiments of this invention, one or more of the monomers acrylonitrile, methacrylonitrile, and the lower alkyl methacrylates, are polymerized by heating in the presence of small but catalytic amounts of benzothiazolyl disulfide, or derivatives of same containing one or more non-interfering groups attached to one or both of the aromatic nuclei. Preferred thermal initiators of the present invention can be represented by the structural formula:

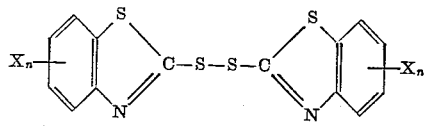

wherein $n$ in either instance is an integer from zero (0) to four (4) inclusive and X in either instance is a non-interfering group, i. e., a group which does not prevent the desired initiation of thermal polymerization of the monomers named. In any of the foregoing, X can be, for example, halogen, aryl, alkyl, cycloalkyl, aralkyl, alkaryl, alkoxy, or can include a chain of four carbon atoms attached at the ends to two adjacent carbon atoms of the aromatic nucleus, thereby forming a fused aromatic ring structure. An example of the latter type of compound is naphthothiazolyl disulfide. As specific examples of constitutents representing X can be mentioned methyl, isobutyl, chloro, bromo, cyclohexyl, methylcyclopentyl, butyoxy, naphthyl, benzyl, phenyl, tolyl, nitro, and the like. In the case of benzothiazolyl disulfide itself, i. e., 2,2'-bis-benzothiazolyl disulfide, both $n$'s are equal to zero (0). It is to be understood that in the benzothiazolyl disulfide compounds, one of the $n$'s in the structural formula can be one numeral and the other $n$ a different numeral, including zero (0), that either X can represent different non-interfering groups attached to the same aromatic nucleus, and that the two X's can represent the same or different groups. Preferred X's are those groups that are electron-releasing, e. g., alkyl, alkoxy, as in many instances they enhance the polymerization initiating effect of the parent compound. Although compounds containing on the aromatic ring electron-attracting groups, e. g., nitro, can be used, they are not preferred because such groups usually tend to reduce the polymerization initiating effect of the parent compound.

The action of benzothiazolyl disulfide compounds towards thermal initiation of polymerization is very specific. Thus, they have no polymerizing activity whatever toward vinyl acetate. They act as retarders for the thermal polymerization of styrene. Benzothiazolyl disulfide retards the thermal polymerization of 2-methyl-5-vinylpyridine, vinyl chloride, and methyl acrylate. Thus, the activity of the benzothiazolyl compounds described herein as thermal initiators (catalysts) for methyl methacrylate, acrylonitrile, methacrylonitrile, and the ethyl, propyl, butyl and the other lower alkyl methacrylates, is most surprising. By the term "lower alkyl methacrylates," I include, for example, methyl methacrylate, ethyl methacrylate, isopropyl methacrylate, n-propyl methacrylate, n-butyl methacrylate, secondary butyl methacrylate, tertiary butyl methacrylates, and the various amyl and hexyl methacrylates in particular, although other lower alkyl methacrylates containing a greater number of carbon atoms, for example, up to 8 or 10 carbon atoms in the alkyl group, fall within the broad scope of the invention.

The invention is effected by heating one of the monomers discussed herein, or a mixture of monomers containing one or more of the monomers discussed herein, in the presence of a small but catalytic amount of a benzothiazolyl disulfide compound effective to increase the rate of polymerization of the monomeric material. The material need only be heated to a temperature sufficient to obtain a desired polymerization rate, and this temperature is preferably in the neighborhood of 100° C., for example, 75° C. to 125° C. Ordinarily a temperature of above 50° C. is used to obtain useful polymerization rates. There is no particular upper limit on the polymerization temperature other than that dictated by the necessity of avoiding decomposition of monomer and/or polymer, keeping in mind that in general the higher the temperature the lower the molecular weight of the resulting polymer. Usually temperatures chosen will not exceed 150 to 175° C.

While the polymerization is often conducted in mass, i. e., in a system wherein the only components of the reaction mixture are the monomer (or monomers) plus the benzothiazolyl disulfide thermal initiator (together with other polymerization initiators and catalysts if desired), the invention is more broadly applicable to all types of polymerization techniques. For example, an added organic solvent for monomer and/or polymer can be present, such as benzene, ethanol, acetone, ethylene dichloride. Further, the polymerization can be effected by the well-known suspension or emulsion techniques. In the former the monomeric material, preferably already containing the benzothiazolyl compound chosen as initiator, is suspended in the form of small particles in a non-solvent liquid, such as water, an added suspending agent such as starch, carboxymethylcellulose, phosphates, vinyl acetate-maleic anhydride copolymer, or the like being present to aid in maintaining the particles separate one from another; during the polymerization the particles tend to grow in size. Emulsion polymerization is similar with the exception that added emulsifying agents are used and the particle size is much smaller so that a stable aqueous emulsion of polymer is the end product of the polymerization. In this instance also it is preferred to dissolve the benzothiazolyl initiator in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary alkyl mercaptans.

Often 0.01 weight per cent of the thermal initiator, based on the weight of monomeric material present, is ample. Almost always, 0.1 weight per cent will be sufficient to obtain a good polymerization rate when the polymerizing mixture is heated to a suitable temperature. More than this quantity is seldom if ever necessary although more, say up to 1 to 5 per cent, can be used if desired. In most instances 0.1 weight per cent of the benzothiazolyl disulfide compound is about the solubility limit in the monomer. If a larger quantity than that which will dissolve in the monomer is desired, a mutual solvent can be employed although in the preferred embodiments of the invention this is not necessary.

The purity of monomer may have a marked effect on the polymerization rate. Thus, with a freshly distilled monomer I have obtained good initiating effect with a benzothiazole compound of the nature described herein, that is, the rate of polymerization was markedly greater than that of the same monomer under the same conditions but without the added initiator. After a period of time the test was repeated and the sample to which the initiator was added was slower in polymerizing than a blank run at the same time. It is thus apparent that changes occurring in the monomer during storage prevented the catalytic effect desired. Some monomers are much more likely than others to exhibit this type of action. Similarly, some benzothiazole compounds are more likely than others to be affected by monomer purity, choice of monomer, and conditions of reaction. The invention encompasses the use of those benzothiazole disulfide compounds effective to increase the rate of thermal polymerization of a given monomeric material of the class described herein with a suitable combination of reaction conditions including monomer purity and quantity of benzothiazole compound. It is usually preferred that the polymerization be effected in the absence of air. Those skilled in the art, having been given the benefit of the present disclosure, will recognize that the principles of the invention may be applicable to polymerization of monomers closely related to acrylonitrile, methacrylonitrile, and lower alkyl methacrylates, containing groups that do not interfere with the desired thermal polymerization.

The following examples illustrate some preferred aspects of the invention but are not to be taken as exhaustive of the broad scope thereof.

EXAMPLE 1

In a series of tests, acrylonitrile in the amount of 20 ml. and 0.02 gram of a given benzothiazole compound were sealed under nitrogen in a Pyrex tube and heated for 20 hours at 95° C. A blank containing only acrylonitrile in the amount of 20 ml. with no added benzothiazole compound was also prepared in the same manner and subjected to the same conditions. After the 20-hour polymerization period each tube was opened, the weighed contents precipitated in excess methanol, filtered, washed with methanol, dried, and weighed again, to determine the amount of polymer formed. The weight per cent of acrylonitrile charged that had been converted to polymer was thus obtained. Results of the tests are given in the following table.

*Thermal polymerization of acrylonitrile*

| Initiator | Conversion, Weight Percent |
|---|---|
| None | 0 |
| 2,2'-bis-Benzothiazolyl disulfide | 3 |
| 2,2'-bis-6-Ethoxybenzothiazolyl disulfide | 7 |
| 2,2'-bis-4-Methylbenzothiazolyl disulfide | 5 |
| 2,2'-bis-5-Chlorobenzothiazolyl disulfide | 3 |
| 2,2'-bis-6-Nitrobenzothiazolyl disulfide | 2 |

Higher conversions can be obtained with longer reaction times and/or larger quantities of initiator.

EXAMPLE 2

Test were made in the same manner, with the same quantities, and at the same conditions, as described in Example 1, with the exception that methacrylonitrile was substituted for acrylonitrile and not as many benzothiazolyl disulfides were tested. Results are in the following table.

*Thermal polymerization of methacrylonitrile*

| Initiator | Conversion, Weight Percent |
|---|---|
| None | 1 |
| 2,2'-bis-Benzothiazolyl disulfide | 6 |
| 2,2'-bis-6-Ethoxybenzothiazolyl disulfide | 6 |
| 2,2'-bis-5-Chlorobenzothiazolyl disulfide | 6 |

EXAMPLE 3

In a manner generally similar to Example 1, the effect of benzothiazolyl disulfide on the thermal polymerization of methyl methacrylate was determined. Amounts were 20 ml. methyl methacrylate and 0.02 gram 2,2'-bis-benzothiazolyl disulfide. Reaction conditions were 95° C. and 2 hours.

Using freshly distilled monomer, the blank (methyl methacrylate alone) gave 4 weight per cent conversion to polymer, while that containing the initiator gave 9 weight per cent conversion to polymer.

A repeat of the foregoing tests with the same batch of methyl methacrylate after storage for one month indicated a slight inhibition of polymerization on addition of the 2,2'-bis-benzothiazolyl disulfide.

2,2'-bis-6-ethoxybenzothiazolyl disulfide caused 30% conversion of methyl methacrylate at 95° C., while a blank under the same conditions gave 5% (4 hours).

EXAMPLE 4

Tests were run by the techniques of Example 1, using 20 ml. vinyl acetate and 0.02 gram initiator, at 95° C. for 30 hours. The following compounds were tested as initiator:

2,2'-bis-benzothiazolyl disulfide
2,2'-bis-6-ethoxybenzothiazolyl disulfide
2,2'-bis-5-chlorobenzothiazolyl disulfide The vinyl acetate alone (no initiator) gave zero (0) per cent conversion to polymer. Likewise, each of the samples of vinyl acetate containing the above-named compounds gave zero (0) per cent conversion to polymer.

In contrast, vinyl acetate at these conditions is easily polymerized using benzoyl peroxide as initiator.

EXAMPLE 5

Tests similar to the foregoing made with styrene monomer, at 95° C. for 8 hours, showed that all benzothiazolyl disulfide compounds tested, viz:

2,2'-bis-benzothiazolyl disulfide
2,2'-bis-6-ethoxybenzothiazolyl disulfide inhibited the thermal polymerization of styrene. The amount of benzothiazolyl disulfide used in each case was 0.02 gram in 20 ml. of styrene.

EXAMPLE 6

By tests similar to Example 5, 2,2'-bis-benzothiazolyl disulfide was found to be an inhibitor for the thermal polymerization of 2-methyl-5-vinylpyridine (blank 30% conversion, catalyzed 21% conversion in 24 hours at 95° C.), of methyl acrylate, and of vinyl chloride.

While the invention has been described herein with particular reference to various preferred embodiments thereof, and numerous examples have been given of suit-

I claim:

1. A polymerization process which comprises heating a polymerizable monomer consisting of a compound selected from the group consisting of acrylonitrile, methacrylonitrile, and the alkyl methacrylates wherein the alkyl group contains up to 10 carbon atoms in the presence of, as the sole polymerization catalyst, small but catalytic amounts of a benzothiazolyl disulfide compound having the formula

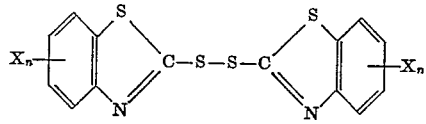

wherein $n$ in either instance is an integer from zero (0) to four (4) inclusive and X in either instance is a non-interfering substituent.

2. A process according to claim 1 wherein said benzothiazolyl disulfide compound is employed in an amount within the range of 0.01 to 0.1 weight per cent of the monomer.

3. A process according to claim 1 wherein said heating is effected at a temperature above 50° C.

4. A process according to claim 1 wherein said polymerization is effected in mass.

5. A process according to claim 1 wherein said polymerization is effected in an aqueous medium.

6. A process according to claim 1 wherein said benzothiazolyl disulfide compound is 2,2'-bis-benzothiazolyl disulfide.

7. A process according to claim 1 wherein said benzothiazolyl disulfide compound is 2,2'-bis-6-ethoxybenzothiazolyl disulfide.

8. A process according to claim 1 wherein said benzothiazolyl disulfide compound is 2,2'-bis-4-methylbenzothiazolyl disulfide.

9. A process according to claim 1 wherein said monomer is acrylonitrile.

10. A process according to claim 1 wherein said monomer is methacrylonitrile.

11. A process according to claim 1 wherein said monomer is methyl methacrylate.

12. A process which comprises subjecting a polymerizable monomer consisting of acrylonitrile to thermal polymerization in the presence of small but catalytic amounts of 2,2'-bis-6-ethoxybenzothiazolyl disulfide as the sole polymerization catalyst present.

13. A process which comprises subjecting a polymerizable monomer consisting of methacrylonitrile to thermal polymerization in the presence of small but catalytic amounts of 2,2'-bis-benzothiazolyl disulfide as the sole polymerization catalyst present.

14. A process which comprises subjecting a polymerizable monomer consisting of methyl methacrylate to thermal polymerization in the presence of small but catalytic amounts of 2,2'-bis-6-ethoxybenzothiazolyl disulfide as the sole polymerization catalyst present.

References Cited in the file of this patent

UNITED STATES PATENTS

| | | |
|---|---|---|
| 2,380,426 | Fryling | July 31, 1945 |
| 2,396,997 | Fryling | Mar. 19, 1946 |